July 25, 1967 P. H. VAN ANROOY ETAL 3,333,143

INSTANT-ON AUTOMATIC DEGAUSSING CIRCUIT
FOR COLOR TELEVISION RECEIVERS
Filed Jan. 17, 1966

INVENTORS.
Leroy W. Nero
Peter H. Van Anrooy
James G. S. Chua

BY Nicholas A. Camasto
Atty.

United States Patent Office 3,333,143

Patented July 25, 1967

3,333,143
INSTANT-ON AUTOMATIC DEGAUSSING CIRCUIT FOR COLOR TELEVISION RECEIVERS

Peter H. Van Anrooy, Itasca, Leroy W. Nero, Des Plaines, and James G. S. Chua, Roselle, Ill., assignors to Admiral Corporation, Chicago, Ill., a corporation of Delaware Filed Jan. 17, 1966, Ser. No. 521,126
9 Claims. (Cl. 315—8)

This invention relates in general to color television receivers and in particular to color television receivers adapted for "instant-on" operation and automatic degaussing.

For years one of the major drawbacks to color television was the susceptibility of the picture tube and associated components to the earth's magnetic field. As a practical matter it was necessary to call a serviceman to demagnetize or degauss the picture tube whenever the set's orientation with respect to the earth's magnetic field was changed or when extraneous magnetic fields, such as those produced by electric motors of vacuum cleaners, etc., upset the original demagnetization.

This problem has been largely overcome by the television industry through the provision of circuitry for automatically degaussing the picture tube during receiver operation. For a complete disclosure of one system in common use see the copending application of Leonard Dietch, Ser. No. 393,061, filed Aug. 31, 1964, and which is now U. S. Patent No. 3,249,795 granted May 3, 1966.

Lately there has been another trend in the television industry and that is to provide for the television receiver being available for viewing substantially instantaneously after turn on. There are numerous well known means available for performing this function. They generally comprise means for disconnecting the B+ load in the television receiver while running the filaments or heater circuit of the vacuum tubes at substantially half power during off or stand-by periods. Thus, when the receiver is switched to full on, the full B+ voltage is available in a few seconds and substantially instant-on operation is achieved.

A problem arises when attempting to combine the instant-on and automatic degaussing functions since automatic degaussing requires a tapered alternating current to pass through the degaussing coils. In particular, the problem is magnified in those automatic degaussing systems, such as those described in the copending application referred to above, which rely on the inrush charging current to perform the degaussing.

Accordingly, a principal object of this invention is to provide an instant-on color television receiver with automatic degaussing.

Another object of this invention is to provide an instant-on color television receiver with automatic degaussing wherein the degaussing is carried out substantially instantaneously after turn on of the receiver.

A further object of this invention is to provide an instant-on color television receiver with automatic degaussing wherein the degaussing is dependent solely upon the inrush charging current for the filter capacitor and wherein minimum delay in initiation of receiver operation is experienced.

Figure 1:
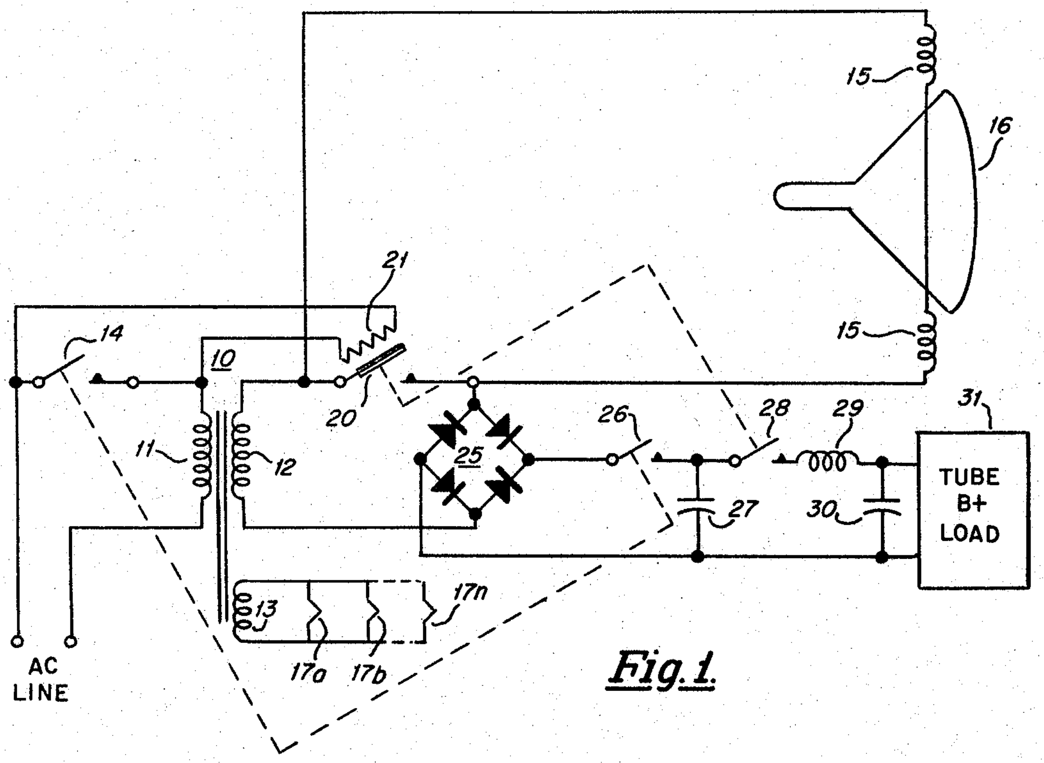
Figure 2:
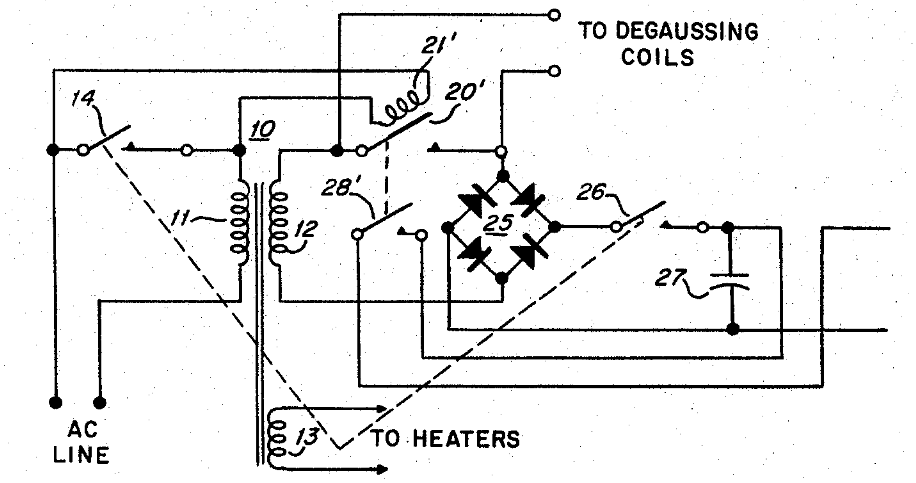

Further objects of this invention will be apparent upon reading the following specification in conjunction with the drawing in which FIG. 1 represents a simplified schematic diagram of a color television receiver incorporating the invention and FIG. 2 depicts a somewhat different apparatus for providing the automatic degaussing.

Referring now to FIG. 1, there is shown a power transformer 10 connectable by a conventional on-off switch 14 to an ordinary household alternating current source (indicated as AC LINE). Transformer 10 has a primary winding 11 and a pair of secondary windings 12 and 13. Secondary winding 13 is conventionally known as a filament winding and supplies the low voltage AC current normally required by the vacuum tube filaments or heaters. A number of these vacuum tube heaters are indicated by 17*a*, 17*b* . . . 17*n*, it being understood that any number may be supplied in either series circuit, parallel circuit or a combination thereof. Of course, more than one filament winding may be employed as required.

Transformer secondary winding 12 is utilized to develop the relatively high potential required for operation of the vacuum tubes. To this end a conventional rectifier bridge arrangement 25 is shown for converting the alternating current from secondary winding 12 into direct current for application to the television receiver vacuum tubes. The output of rectifier 25 is connected through a switch 26 to a filter capacitor 27. Filter capacitor 27 is preferably of the electrolytic type and may comprise one or more sections of a conventional multi-section can type of electrolytic capacitor. Filter capacitor 27 is also connected through a switch 28 to a filter inductance 29 which is further connected to an additional filter capacitor 30 in a conventional "pi" type filter network. The output of the filter network is shown supplying a box 31 labeled TUBE B+ LOAD.

Interposed in series between secondary winding 12 and rectifier bridge network 25, is a switch arrangement for controlling current flow in a circuit consisting of a pair of degaussing coils 15. Degaussing coils 15 are permanently mounted in a predetermined physical relationship to picture tube 16 in the television receiver. In the embodiment of the invention of FIG. 1, the switch element for enabling and disabling the degaussing coils consists of a bi-metal strip 20 which is heated by a resistance element 21. Resistance element 21 is connected in parallel with on-off switch 14 of the television receiver. The dashed line joining switch 14 and switch 26 indicates that these switches are ganged together to form a two-pole switch and therefore operate simultaneously. Similarly, the dashed line joining strip 20 and switch 28 indicate some interconnection between these elements. As will be seen later, switch 28 may close simultaneously with closure of strip 20 but in no case should it be allowed to close before strip 20.

All of the switches in the circuit of FIG. 1 are shown in the stand-by or off position. In this position on-off switch 14 is open and the television receiver is off as far as the viewer is concerned. It will be seen that a circuit exists between the AC line and transformer primary 11, which includes resistance element 21. The resistance of this element is selected such that transformer 10 operates to develop voltages substantially less than the voltages normally produced across secondary windings 12 and 13. The heat generated by resistance 21 is sufficient to cause deflection of bi-metal strip 20 and open the contacts which normally short-circuit degaussing coils 15 during set operation. It will be recalled that switches 26 and 28 are also open thus isolating filter capacitor 27. It may be desirable to include a high value bleeder resistor in parallel with filter capacitor 27 to insure complete discharge thereof although for normal operation (i.e. without fast on-off-on cycling of the receiver), sufficient leakage exists in the electrolytic capacitors for discharge to occur.

With the heater winding 13 operating at less than normal voltage, the receiver tube heaters 17*a*, 17*b* . . . 17*n* are supplied approximately one-half normal operating power and thus do not attain normal operating temperatures. Operation at half power has been previously determined in the art to optimize the various factors of cathode aging, power loss and instant-on operation. Upon closure of switch 14, switch 26 which is ganged therewith also closes connecting filter capacitor 27 across the output of rectifier bridge 25. Closure of switch 14 also shorts out heater element 21 which is designed to rapidly cool. Transformer 10 is now supplied with normal operating potential and the voltages developed across windings 12 and 13 assume normal values. Since the filaments in the vacuum tubes have been maintained in a warm condition, they very quickly achieve full operating temperatures. Simultaneously, a large inrush current flows through the rectifier bridge and switch 26 into discharged filter capacitor 27. This current of necessity must flow through degaussing coils 15, and is characterized by a high initial amplitude and a rapid decay rate. As the charging current swings through its cycles with diminishing amplitude, demagnetization of the picture tube and its associated permeable elements occurs. It has been determined that about two seconds are required for the degaussing action.

When filter capacitor 27 is substantially fully charged, resistance element 21 will generally have cooled sufficiently to allow bi-metal strip 20 to assume its relaxed, closed position in which degaussing coils 15 are short-circuited. As heretofore explained, the mechanical interlocking arrangement existing between switch 28 and bi-metal strip 20 closes switch 28 simultaneously or a short time after closure of bi-metal strip 20. With closure of switch 28, an additional slight delay is experienced due to the charging of filter capacitor 30 before the television receiver is supplied full B+ voltage and assumes normal operation. The entire time taken for these operations to occur is between two seconds minimum and approximately four seconds maximum. Thus instant-on operation is preserved whill full automatic degaussing is performed.

When the receiver is turned off, resistance element 21 again is placed in series with transformer primary 11, and upon heating, flexes bi-metal strip 20 into its open position. Switch 26 is also opened by the mechanical interlock. Thus, the television receiver is again placed in the stand-by condition with no B+ voltage, substantially half filament power and its degaussing circuit in the "ready" condition.

The interlock between strip 20 and switch 28 may take a variety of forms well known in the art. For example, switch 28 could readily be an insulated extension of strip 20.

The circuit of FIG. 2 is similar to that of FIG. 1 and like elements have been given corresponding reference designations. The major difference in FIG. 2 resides in the means for short-circuiting the degaussing coils. In this circuit a magnetic coil 21' is provided for operating a pair of switch elements 20' and 28' which correspond exactly in function to switch elements 20 and 28 of FIG. 1. In this embodiment magnetic coil 21' has a resistance which is substantially the same as the resistance of resistance elements 21 in FIG. 1 to provide the reduced operating potential for transformer 10 when the television receiver is in the off or stand-by condition. In other respects, the circuits are identical in operation with the exception that upon closure of switch 14, coil 21' is short-circuited and switch elements 20' and 28' are released to their normally closed positions. It is, of course, obvious that the release of the switch elements is delayed to allow full demagnetization to occur. This may readily be accomplished by any of the numerous well known means in both the magnetic and mechanical arts for effecting such delay.

What has been described are circuit arrangments for providing automatic degaussing of a color television receiver without sacrificing the instant-on feature thereof. It is recognized that numerous modifications in the disclosed embodiments of the invention may be made by those skilled in the art without departing from the true spirit and scope thereof as set forth in the claims.

The embodiments of the invention in which an exclusive property or privilege is claimed are defined as follows:

1. In combination with a color television receiver having a picture tube susceptible to external magnetic fields and including a plurality of vacuum tubes requiring DC operating current and AC heater current; degaussing means adjacent said picture tube for periodically demagnetizing said picture tube; power supply means; filter means; means altering said power supply means for supplying less than normal heater power to said vacuum tubes during off periods of said television receiver; means disconnecting said filter means during said off periods; means disabling said degaussing means a predetermined time after turn on of said television receiver whereby said degaussing means are supplied a high initial amplitude, rapidly decaying, alternating current for demagnetization of said picture tube; and means completing a path for said DC operating current only when said degaussing means have been disabled.

2. In combination with a color television receiver having a picture tube susceptible to external magnetic fields and including a plurality of vacuum tubes requiring DC operating current and AC heater current; a degaussing coil adjacent said picture tube for periodically demagnetizing said picture tube; power supply means; a filter capacitor; means altering said power supply means for supplying less than normal heater power to said vacuum tubes during off periods of said television receiver; first switch means disconnecting said filter capacitor during said off periods, said first switch means also connecting said filter capacitor to said power supply means upon turn on of said receiver; second switch means disabling said degaussing means a predetermined time after turn on of said receiver whereby said degaussing coil is supplied a high inrush alternating current for demagnetization of said picture tube; and third switch means completing a path for said DC operating current only when said degaussing means have been disabled.

3. In combination with a color television receiver having a picture tube susceptible to external magnetic fields and including a plurality of vacuum tubes requiring DC operating current and AC heater current; a degaussing coil adjacent said picture tube for periodically demagnetizing said picture tube; power supply means including a transformer having a heater winding; filter means including an electrolytic capacitor; voltage dropping means for reducing the input voltage to said transformer and hence lowering the voltage of said heater winding to supply less than normal heater current to said vacuum tubes during off periods of said television receiver; means for disconnecting said electrolytic capacitor during said off periods; contact means shorting said degaussing coil a predetermined time after turn on of said receiver whereby said degaussing coil is only supplied the high inrush current for charging said electrolytic capacitor; and switch means completing a path for said DC operating current when said deguassing coil is shorted.

4. The combination of claim 3 wherein said contact means and said voltage dropping means include a common resistance and wherein said contact means comprises a fast acting bi-metal switch element in thermal communication with said resistance; said resistance also serving to reduce the transformer input voltage during off periods of said receiver.

5. The combination of claim 4 wherein said switch means include a switch element ganged with said bi-metal switch element to insure complete degaussing prior to flow of DC load current.

6. The combination of claim 5 wherein said voltage dropping means further includes a two-pole switch, one pole being used for turning the receiver on and off and the other pole comprising said means for disconnecting said electrolytic capacitor.

7. The combination of claim 3 wherein said contact means and said voltage dropping means include a common resistance and wherein said contact means comprises a magnetically operated switch, said resistance also serving to reduce the transformer input voltage and comprising at least a portion of the coil resistance of said magnetically operated switch.

8. The combination of claim 7 wherein said switch means is magnetically operable with said magnetically operated switch to insure complete degaussing prior to flow of DC load current.

9. The combination of claim 8 wherein said voltage dropping means includes a two-pole switch, one pole being used for turning the receiver on and off and the other pole comprising said means for disconnecting said electrolytic capacitor.

No references cited.

JAMES W. LAWRENCE, *Primary Examiner.*

V. LAFRANCHI, *Assistant Examiner.*